(12) United States Patent
Liu et al.

(10) Patent No.: US 11,375,412 B2
(45) Date of Patent: Jun. 28, 2022

(54) METHOD FOR REALIZING CONTINUED TRANSMISSION OF USER DATA DURING HANDOVER CROSSING MULTIPLE CELLS

(71) Applicant: GUANGDONG NUFRONT COMPUTER SYSTEM CHIP CO., LTD, Guangzhou (CN)

(72) Inventors: Qianlei Liu, Beijing (CN); Shenfa Liu, Beijing (CN); Desheng Yan, Beijing (CN); Dongshan Bao, Beijing (CN)

(73) Assignee: QUANGDONG NUFRONT COMPUTER SYSTEM CHIP CO., LTD., Guangzhou (CN)

( * ) Notice: Subject to any disclaimer, the term of this patent is extended or adjusted under 35 U.S.C. 154(b) by 340 days.

(21) Appl. No.: 16/333,175

(22) PCT Filed: Dec. 7, 2016

(86) PCT No.: PCT/CN2016/108810
§ 371 (c)(1),
(2) Date: Mar. 13, 2019

(87) PCT Pub. No.: WO2018/090410
PCT Pub. Date: May 24, 2018

(65) Prior Publication Data
US 2019/0223059 A1 Jul. 18, 2019

(30) Foreign Application Priority Data
Nov. 16, 2016 (CN) .......................... 201611007139.4

(51) Int. Cl.
H04W 36/00 (2009.01)
H04W 8/26 (2009.01)
(Continued)

(52) U.S. Cl.
CPC ....... *H04W 36/0016* (2013.01); *H04L 45/122* (2013.01); *H04W 8/26* (2013.01);
(Continued)

(58) Field of Classification Search
CPC ............... H04W 8/26; H04W 36/0055; H04W 36/0016; H04W 36/00835; H04W 40/36;
(Continued)

(56) References Cited

U.S. PATENT DOCUMENTS 7,466,703 B1 * 12/2008 Arunachalam ..... H04L 49/3009
370/392
8,325,676 B2 * 12/2012 Chen ................. H04W 36/0011
370/331

(Continued)

FOREIGN PATENT DOCUMENTS

CN 101141493 * 11/2007
CN 101141493 A 3/2008
(Continued)

OTHER PUBLICATIONS

The World Intellectual Property Organization (WIPO) International Search Report for PCT/CN2016/108810 dated May 23, 2017 6 Pages (including translation).
(Continued)

*Primary Examiner* — Redentor Pasia
(74) *Attorney, Agent, or Firm* — Anova Law Group, PLLC

(57) ABSTRACT

Disclosed in the present disclosure is a method for realizing continued transmission of user data when a user station crosses multiple wireless network cells. The method includes: constructing a continuation guide table in an access point (AP) of a wireless network cell; when a user station crosses a first cell to a second cell, configuring the continuation guide tables in the AP of the first cell and the
(Continued)

AP of the second cell; based on the continuation guide tables, building a data link of a network layer between an correspondent station of the user station and the user station located in a terminal cell; continuously transmitting data between the correspondent station of the user station and the user station in a source cell along the data link after the user station accesses the terminal cell. Further disclosed in the present disclosure is an access point device of a wireless network cell. According to the present disclosure, uninterrupted transmission of data streams can be realized for data being transmitted during a complex condition that a user station crosses a plurality of wireless network cells, thereby improving the user experience when a user surfs the internet using a wireless network.

15 Claims, 2 Drawing Sheets

(51) Int. Cl.
*H04W 40/36* (2009.01)
*H04W 40/24* (2009.01)
*H04L 45/122* (2022.01)
*H04W 36/02* (2009.01)
*H04L 61/2514* (2022.01)

(52) U.S. Cl.
CPC . *H04W 36/0055* (2013.01); *H04W 36/00835* (2018.08); *H04W 40/24* (2013.01); *H04W 40/248* (2013.01); *H04W 40/36* (2013.01); *H04L 61/2514* (2013.01); *H04W 36/023* (2013.01)

(58) Field of Classification Search
CPC .... H04W 40/248; H04W 40/24; H04L 45/122
See application file for complete search history.

(56) References Cited

U.S. PATENT DOCUMENTS

| | | | | |
|---|---|---|---|---|
| 10,348,603 B1* | 7/2019 | Singh | ................. | H04L 45/7453 |
| 10,547,544 B2* | 1/2020 | Edsall | .................... | H04L 49/10 |
| 2003/0072318 A1* | 4/2003 | Lam | ....................... | H04L 45/04 370/428 |
| 2004/0190477 A1 | 9/2004 | Olson et al. | | |
| 2008/0205393 A1* | 8/2008 | Jeong | .................... | H04W 40/36 370/389 |
| 2010/0008233 A1* | 1/2010 | Ee | ........................... | H04L 45/72 370/241 |
| 2011/0116389 A1* | 5/2011 | Tao | ......................... | H04L 45/18 370/252 |
| 2013/0039249 A1* | 2/2013 | Ravindran | ......... | H04W 36/026 370/312 |
| 2013/0132608 A1* | 5/2013 | Gerber | .................... | H04L 12/56 709/238 |
| 2013/0266007 A1* | 10/2013 | Kumbhare | ............. | H04L 45/56 370/389 |
| 2014/0169377 A1* | 6/2014 | Shuai | ..................... | H04L 45/02 370/392 |
| 2014/0362705 A1* | 12/2014 | Pan | ........................ | H04L 45/00 370/237 |
| 2015/0139193 A1* | 5/2015 | Murphy | ............. | H04L 12/6418 370/331 |
| 2016/0142293 A1* | 5/2016 | Hu | ........................ | H04L 45/745 370/392 |
| 2016/0212048 A1* | 7/2016 | Kaempfer | ............ | H04L 45/745 |
| 2017/0207963 A1* | 7/2017 | Mehta | ................ | H04L 41/0896 |
| 2017/0222926 A1* | 8/2017 | Mack-Crane | ......... | H04L 45/745 |
| 2017/0264530 A1* | 9/2017 | Hou | ...................... | H04L 45/023 |
| 2019/0253380 A1* | 8/2019 | Bennett | .............. | H04L 61/1552 |

FOREIGN PATENT DOCUMENTS

| | | |
|---|---|---|
| CN | 102655660 A | 9/2012 |
| CN | 105188103 A | 12/2015 |

OTHER PUBLICATIONS

Xuefeng Cao, "Principle of Computer Network-Protocol Analysing Method Based on Experiment", Jan. 31, 2014 (Jan. 31, 2014), the main body, pp. 277-279, non-official translation.

* cited by examiner

METHOD FOR REALIZING CONTINUED TRANSMISSION OF USER DATA DURING HANDOVER CROSSING MULTIPLE CELLS

CROSS-REFERENCE TO RELATED APPLICATIONS

This application claims the benefit of International Applications No. PCT/CN2016/108810, filed on Dec. 7, 2016, which claims the benefit of Chinese Application CN201611007139.4, filed on Nov. 16, 2016. The entire contents of both applications are incorporated herein by reference.

FIELD OF THE INVENTION

The invention relates to the field of wireless network communication, especially to the realization of cross-cell handover of user stations in a wireless network system.

BACKGROUND OF THE INVENTION

With the continuous development of wireless communication technology and network technology, wireless network has been increasingly applied. In addition to cellular communication technology, a variety of wireless network technology suitable for different scenarios have been proposed and applied in the corresponding scenarios, for example, WiFi technology that enables fast data communication in a small coverage area, ZigBee technology that can realize the access of many nodes, and WiMAX technology that enables users to quickly wirelessly access the Internet in a wide area. An ultra-high speed wireless LAN technology (EUHT) has been proposed, which can provide higher data rates than WiFi technology, and can provide support for users' mobile speed. It also provides greater coverage than WiFi technology support for higher mobile speed, and a higher data rate. The technology has been applied to the Internet access of high-speed rail systems and wireless broadband access in rural areas. In addition, it can be expected that with the development of wireless communication technologies and network technologies, more wireless network technologies suitable for specific scenarios will emerge.

In these wireless network technologies, many technologies cannot support the continuous transmission of user data streams when a user cross-cell handover occurs in a wireless network. For example: when a WiFi user station leaves the current WiFi cell and enters an adjacent WiFi cell, currently the WiFi standard does not support the data currently being transmitted by the user being continuously transmitted in the new WiFi cell. And when the user station spans a wireless network cell based on different types of wireless communication technologies (that is: wireless communication technologies based on different physical layer and/or MAC layer communication standards), such as crossing from a WiFi cell to a WiMAX cell, it is more difficult to realize that the data being transmitted by the user station in the original cell to be continuously transmitted in the new cell.

When the user moves, because the coverage radius of the wireless network cell is relatively small relative to the user's moving speed, or the data stream connected by the user lasts for a long time, etc., such a problem often occurs that the data stream being transmitted cannot be connected in the new cell when the cell (the cells may be implemented based on different types of wireless communication technologies) when a user station cross a plurality of wireless network cells. In particular, when the user station is in the process of crossing a plurality of wireless network cells, a new data connection is initiated to the external network station in the passing cell, which makes the continued transmission of user data in the case of multi-cell handover more complicated and difficult to realize.

SUMMARY OF THE INVENTION

The present disclosure provides a method for realizing continued transmission of user data when a user station cross multiple cells. The method is realized by setting a guide table supporting data continued transmission in a network layer part of an AP of an involved cell. It does not require extensive upgrades to existing networks, and has the characteristics of low investment and strong realizability. By applying the method provided by the present disclosure to a current wireless network cell, user experience when the user uses the wireless network to access the Internet in the mobile state can be greatly improved.

The present disclosure provides a method for realizing continued transmission of user data during cross-cell handover of a user station in a wireless network cell, comprising: constructing a continuation guide table in an access point (AP) of a wireless network cell; when handover, crossing previous and next cells, of a user station occurs, configuring continuation guide tables in an AP of a previous cell and an AP of a next cell; based on the continuation guide tables configured in the AP, building a data link of a network layer between a correspondent station of the user station and a user station located in a terminal cell; realizing the continued transmission of data transmitted between the correspondent station of the user station and the user station of the source cell through the data link after the user station accesses the terminal cell; optimizing the hop path by the on the data link: AP optimizes the configuration of the continuation guide table in AP of the source cell and AP of the current, when AP discovers that AP of the source cell of the data stream continuedly transmitted is different from the previous hop station, and configures a direct hop path between the AP of the source cell and the AP of the current cell; according to the optimized configuration continuation guide table, building a data link of a network layer between an correspondent station of the user station and a user station located in a terminal cell; based on the optimized configuration of the continuation guide table, a data link of the network layer is constructed between the correspondent station of the user station and the user station located in the terminal cell; realizing the continued transmission of data transmitted between the correspondent station of the user station and the user station of the source cell through the data link after the user station accesses the terminal cell.

Before the optimized hop path is constructed, transfer the data packets through the original hop path that have been transmitted though the original hop path.

The continuation guide table in the AP, comprising: a wireless transfer table, used to determine that the user station leaves the cell and enters a new cell: according to the IP address of the cell user station, in the wireless transfer table finding out the wireless MAC address of the user station, or determining that it has left the cell and entered a new cell; a continuation hop table, used to find the address of the next hop station for continuous forwarding: for the user station that has accessed or is still in the cell, when the data packet of the user station is continuedly transmitted to the AP, finding the address of the next hop station which forwarded the packet by the AP.

the wireless transfer table is specifically:

| IP address of the user station | MAC address of the user station |
|---|---| the value of the MAC address of the user station entry is invalid, indicating that the corresponding user station has left the cell and entered a new cell.

The continuation hop table is specifically:

| global IP address of the previous hop station | global IP address of source AP | IP address of the user station in the source cell | IP address of the next hope station |
|---|---|---|---|

Global IP address of the previous hop station and the global IP address of source AP, specifically: when the global IP address of the previous hop station is the first invalid value, indicating that the current AP is the source cell AP of the data flow corresponding to the table row; and/or, when the global IP address of the previous hop station is the second invalid value, indicating that the table row does not allow forwarding forwarded transmitted data packet; and/or, when the global IP address of source AP is an invalid value, indicating that the table row does not allow forwarding reversed transmitted data packet.

By querying the configured continuation hop table, the AP can not only find the address of the next hop station that forwards the forward-transmitted data packet, but also can find the next hop station that forwards the reverse-transmitted data packet.

Forward transmission is data transmission from the correspondent station of the user station to the user station; and reverse transmission is data transmission from the user station to its correspondent station.

The data link constructed between the correspondent station of the user station and the user station located in the terminal cell, specifically: includes a forward link from the correspondent station of the user station to the user station and a reverse link from the user station to its correspondent station.

The forward link includes one or more sub-links, and each sub-link consists of the correspondent station of the user station, AP of source cell, N APs of intermediate cell, AP of final cell, and a user station, N=0, 1, 2, . . . .

The reverse link includes one or more sub-links, and each sub-link is composed of a user station, AP of terminal cell, N APs of intermediate cell, AP of source cell, and the correspondent station of the user station, N=0, 1, 2, . . . .

The data link constructed between the correspondent station of the user station and the user station located in the terminal cell, specifically: the implementation of the data link does not require the use of the IP address of the user station at the intermediate cell.

Realizing the continued transmission of data transmitted between the correspondent station of the user station and the user station of the source cell through the data link after the user station accesses the terminal cell, specifically: except the data packet transmission between AP of the source cell and the correspondent station of the user station, each station encapsulates the forwarded data packet by means of IP in IP, then sends it to the next hop station.

The original IP packet encapsulated in the IP in IP packet is a data packet transmitted between AP of the original cell and the user station when the user station is still in the original cell.

According to the data that is continuously transmitted after the user station accesses the terminal cell, obtaining the address of the next hop station of the reverse-transmitted data packet by the user station, including: after receiving the forward-transmitted IP in IP packet forwarded by its previous hop station, using the source address of the IP in IP packet as the address of the next hop station when it reversely transmits the data packet.

In order to achieve the above objectives, the disclosure provides an AP of a wireless network cell, comprising: setting a continuation guide table, including a continuation hop table which is used to find the address of the next hop station that is continuously forwarded: for the user station that has accessed or is still in the cell, when the user station's data packet that is transmitted continuously is sent to the AP, the AP may find the address of the next hop station that forwards the data packet from the table; the continuation guide table, further including a wireless transfer table which is used to indicate that the user station leaves the cell and enters a new cell: according to the IP address of the user station of the cell, AP finds the wireless MAC address of the user station from the table, or determines that it has left the local cell and enters a new cell.

The wireless transfer table for indicating that the user station leaves the local cell and enters new cell information, specifically: for a user station in the cell where no handover occurs, realizing the normal wireless forwarding function through this table by the AP.

A wireless network terminal, comprising: an IP address resolution module, used for: after confirming that the original IP packet encapsulated in the received IP in IP packet is a continuous forwarding packet sent to itself, taking the source address of the above IP in IP packet as the address of the next hop station for the reverse-transmitted data packet of the terminal.

DETAILED DESCRIPTION OF THE INVENTION

Figure 1:
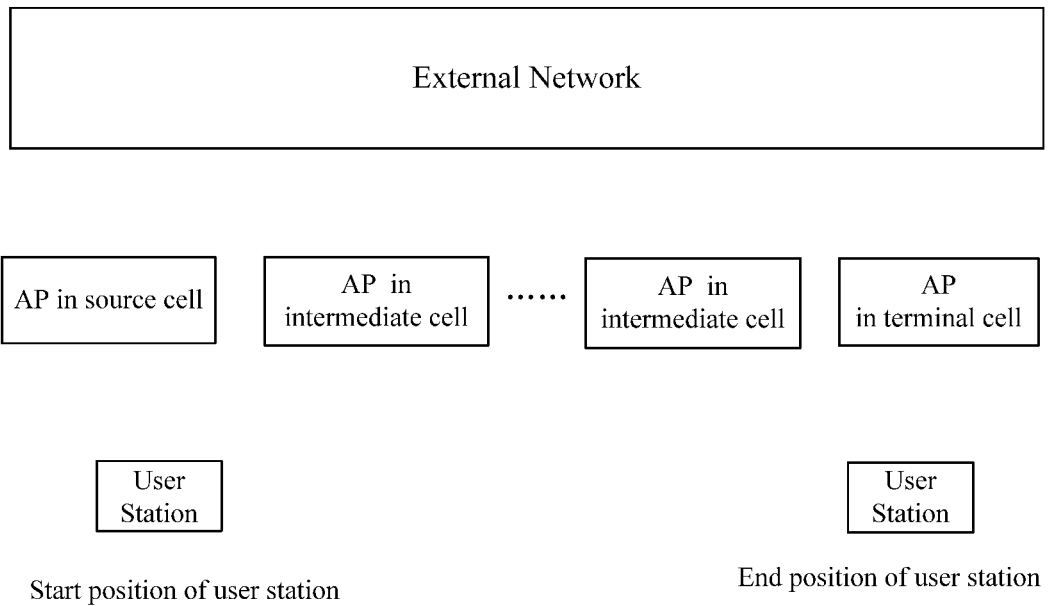
FIG. 1 is a schematic diagram of a multi-cell handover occurring of a user station according to an embodiment of the present disclosure.

The present disclosure provides a method for implementing continued transmission of data currently being transmitted when a user station crosses multi-cells in a wireless network.

In the method provided by the present disclosure, a wireless network cell is composed of an access point (AP) and a number of user stations. The AP implements wireless coverage of user stations in the cell by adopting a wireless communication technology, and the AP is also connected to the external network, so that the user station in the cell can access the Internet to the external network. The wireless coverage of the user station in the cell by the AP includes the situation that the AP acts as a central base station to achieve direct physical signal coverage for all user stations in the cell, and the situation that the AP can implement wireless connection for all user stations in the cell by means of direct coverage or multi-hop transmission, for example, the cell is a wireless mesh network (wireless mesh network) cell.

In the method provided by the present disclosure, there is a group of wireless network cells that are connected to a common external network through respective APs. The wireless network cells may be wireless network cells using the same wireless communication technology, or wireless network cells using different wireless communication technologies. The same type of wireless communication technology herein refers to a technology that uses the same physical layer and MAC layer wireless communication standard, and different types of wireless communication technologies refer to technologies that use different physical layer and/or MAC layer wireless communication standards.

A typical example of a common external network to which these wireless network cells are connected is the Internet.

In the method provided by the present disclosure, AP of the wireless network cell refers to a station in the wireless network that can implement wireless coverage of the user station on the one hand, and connect to the external network on the other hand, and can communicate with the external network. This station may have different names in different wireless communication protocols.

In the method provided by the present disclosure, the station in the wireless network cell and the external network to which the wireless network cell is connected support the IP protocol, including but not limited to the IPv4 protocol and the IPv6 protocol.

In the method provided by the present disclosure, when a user station accesses a certain wireless network cell, a certain station, usually an AP assign an IP address to the user station, the IP address configured by the user station is divided into two types: global IP address and local IP address. Generally, the AP configures global IP addresses or local IP addresses for all user stations in the wireless network cell, and accordingly, the wireless network cell is divided into two types: a cell configured with a global IP address and a cell configured with a local IP address. In the description of the present disclosure, the two types of cells are also called a global IP cell and a local IP cell, respectively.

In special cases, the AP can also configure a global IP address for some user stations in its cell and a local IP address for other user stations. In the description of the present disclosure, for convenience of description, such a cell is also called a local IP cell, and the corresponding AP is also called an AP of a local IP cell.

In the method provided by the present disclosure, for a local IP cell, the AP of the cell must support a NAT (Network Address Translation) protocol or other equivalent protocol, and through the address translation of the protocol, communication between the user station having only the local IP address in the cell and the station of the external network is realized.

In the IPv6 protocol, all stations will be configured with global IP addresses, so there will be no local IP cells.

The present disclosure contemplates a situation where a user station experiences handover across multiple wireless network cells. FIG. 1 is a schematic diagram of a multi-cell handover occurring of a user station. In this situation, the user station is transmitting data in the first cell, and after switching across multiple cells, it enters the last cell. For the sake of brevity of description, in the description of the present disclosure, the cell in which the user station in the cross-multi-cell handover is initially located is called a source cell, and the corresponding AP is AP of source cell or a source AP; the cell that the user station finally arrives at is called the final cell, and the corresponding AP is AP of the terminal cell or the terminal AP. The cell that the user station passed through is called the intermediate cell, and the corresponding AP is AP of the intermediate cell.

Figure 2:
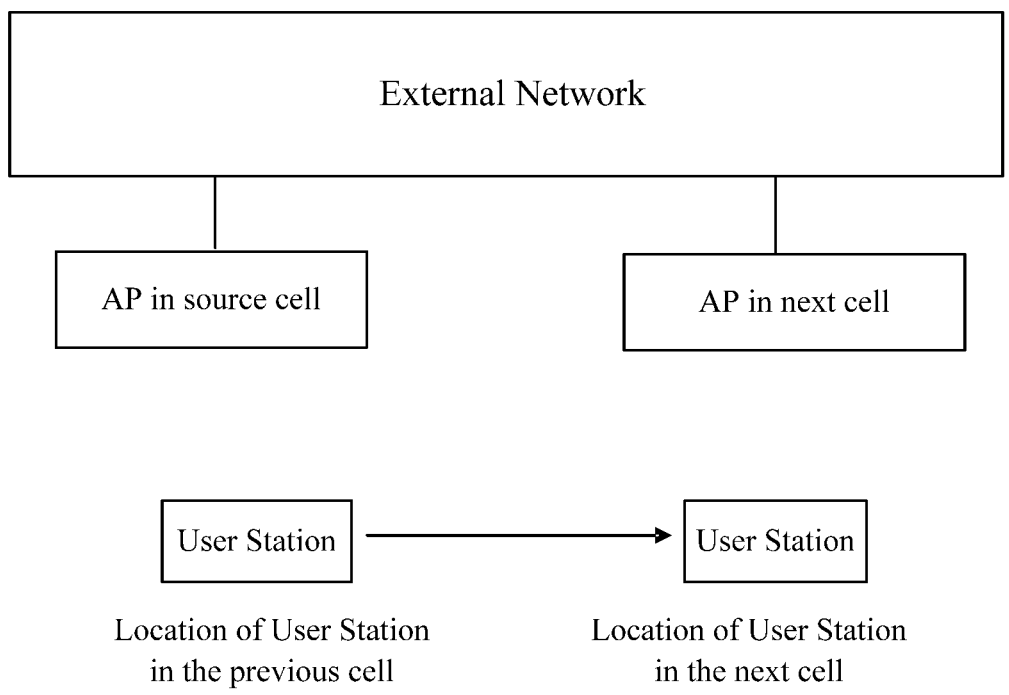
FIG. 2 is a schematic diagram of handover, crossing previous and next cells, of a user station occurs, according to an embodiment of the present disclosure.

The handover across multiple cells shown in FIG. 1 is made up of multiple handovers across two adjacent cells. FIG. 2 shows a schematic diagram of a handover for each of two adjacent cells. In the handover between the two adjacent cells, the user station leaves the previous wireless network cell and enters the next wireless network cell. For the sake of brevity of description, in the description of the present disclosure, the former wireless network cell is called a previous cell, the corresponding AP is a previous cell AP or a previous AP, and the newly entered wireless network cell is called a post-cell, the corresponding AP is a post-cell AP or a post-AP; the handover across two adjacent cells is called handover of previous cells and post-cells.

In the technical solution provided by the present disclosure, after the user station accesses a certain wireless network cell, it communicates with another station outside the local cell via the AP of the cell, and realizes data transmission between each other; or it can also communicate with another station of the cell via the AP to realize data transmission between each other. For convenience of description, the present disclosure refers to the station that communicates with the current user station and realizes data transmission, which is called the correspondent station of the user station, referred to as the correspondent station.

The data transmission of the user station and its correspondent station includes data transmission from the correspondent station to the user station and data transmission from the user station to the correspondent station. For the convenience of description, in the present disclosure, the data transmission from the correspondent station to the user station is called forward data transmission, and the data transmission from the user station to its correspondent station is called reverse data transmission.

In the IP protocol, there is an IP in IP mechanism, which encapsulates one IP packet (called the original IP packet) in another IP packet (called an encapsulated IP packet), transferring the original IP packet as the payload of encapsulated IP packet. In the method provided by the present disclosure, both the AP and the user station need to support the IP in IP mechanism. In the description of the present disclosure, the original IP packet and the encapsulated IP packet in the IP in IP mechanism are called an internal IP packet and an external IP packet, respectively, and the term IP in IP packet refers to an encapsulated IP packet. The address of the IP in IP packet refers to the address of the encapsulated IP packet.

In a network supporting the IP protocol, the AP of the wireless network cell sends an IP data packet to the user station under its coverage, and needs to maintain a network layer address-MAC layer address correspondence table at its network layer, that is a IP address-MAC address correspondence table. In the IPv4 protocol, this table is also called an ARP (Address Resolution Protocol) table. The IP address-MAC address correspondence table is composed of a plurality of table rows, and each table row represents address corresponding information of a user station, specifically: two entries including a user station IP address and a user station MAC address. Since the IP address-MAC address correspondence table plays a role in forwarding the IP packet from the correspondent station of the user station to the wireless user station in the data transmission of the AP, in the description of the present disclosure, it is called wireless transfer table. The structure of the wireless transfer table in the AP is as shown in Table 1.

TABLE 1

| Wireless transfer table in the AP | |
|---|---|
| IP address of the user station | MAC address of the user station |

Figure 3:
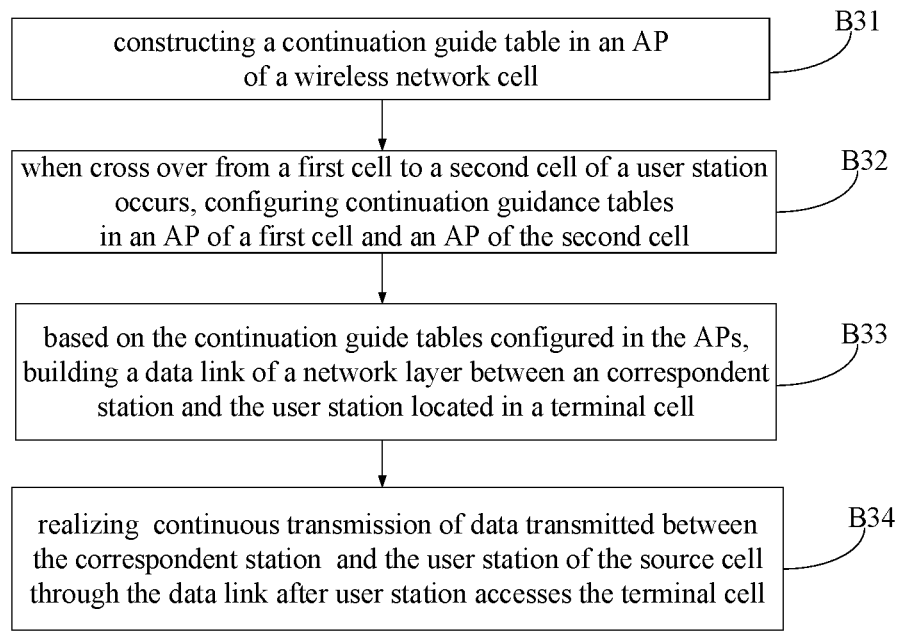
FIG. 3 is a flowchart of a method for realizing user data continued transmission when a multi-cell handover occurs according to an embodiment of the present disclosure.

Referring to FIG. 3, a method for realizing continued transmission of user data during cross-cell handover of a user station in a wireless network cell, comprising:

B31, constructing a continuation guide table in an AP of a wireless network cell;

B32, when handover, crossing previous and next cells, of a user station occurs, configuring continuation guide tables in an AP of a previous cell and an AP of a next cell;

B33, based on the continuation guide tables configured in the AP, building a data link of a network layer between an correspondent station of the user station and a user station located in a terminal cell;

B34, realizing the continued transmission of data transmitted between the correspondent station of the user station and the user station of the source cell through the data link after the user station accesses the terminal cell.

The method for realizing continued transmission of user data provided by the embodiment of the present disclosure further includes:

optimizing the hop path by the AP on the data link: the AP optimizes the configuration of the continuation guide table in AP of the source cell and AP of the current, when AP of the source cell of the data stream continuedly transmitted is different from the previous hop station, and configures a direct hop path between the AP of the source cell and the AP of the current cell;

according to the optimized configuration continuation guide table, build a data link of a network layer between a correspondent station of the user station and a user station located in a terminal cell;

based on the optimized configuration of the continuation guide table, a data link of the network layer is constructed between the correspondent station of the user station and the user station located in the terminal cell;

realize the continued transmission of data transmitted between the correspondent station of the user station and the user station of the source cell through the data link after the user station accesses the terminal cell.

In the technical solution provided by the present disclosure, the continuation guide table in the AP is composed of a wireless transfer table and a continuation hop table.

The function related to the wireless transfer table and the continuation hop table in the AP is to indicate that the user station leaves the local cell and enters the new cell: the AP finds the wireless MAC address of the user station according to the IP address of the user station of the cell, or determines that it has left the cell and entered a new cell.

The wireless transfer table adopts the original wireless transfer table in the AP, but redefines the assignment range of the MAC address entry of the user station. The specific method is: Assign a value to an entry of invalid MAC address of the user station in the table, and the assignment information is used to indicate the status information of the corresponding user station leaving the local cell and accessing the new cell. The invalid MAC address of the user station refers to value of a certain MAC address that cannot be the MAC address of the user station, including but not limited to: MAC address of the AP itself in the cell, and the value of MAC address defined by the MAC protocol which is not available as the user station MAC address, etc.

When the AP sends data of the user station according to the newly defined wireless transfer table, when the AP finds its MAC address from the wireless transfer table by the IP address of the user station, if the MAC address of the user station is found to be invalid, it can be determined that the user station has left the cell and accesses the new cell, and further forwards the data packet; and when the AP obtains the valid MAC address of user station from the wireless transfer table, it uses the MAC address to send the IP data packet to the user station in the cell.

The function of the added continuation hop table in the AP is: for the user station that has accessed or is still in the cell, when the data packet of the user station is continuously transmitted to the AP, AP can use the table to find the address of the next hop station which forwarded the packet.

The continuation hop table is as shown in Table 2. It consists of several table rows, each table row contains four entries: the global IP address of the previous hop station, the global IP address of the source AP, IP address of the user station in source cell, and IP address of the next hop station. The IP address of the next hop station, or IP address of the user station in the current cell (the current AP is the terminal AP), or the global IP address of the next hop AP (the current AP is not the terminal AP).

TABLE 2

| continuation hop table in the AP | | | |
|---|---|---|---|
| global IP address of the previous hop station | global IP address of source AP | IP address of the user station in the source cell | IP address of the next hope station |

In the method provided by the present disclosure, some information indication can be indicated by setting the value of some entries in continuation hop table to an invalid value. This includes: setting the global IP address entry of the previous hop to the first invalid value, indicating that the current AP is the source AP of the data transmission corresponding to the user station; the global IP address entry of the previous hop is set to the second invalid value, indicating the table row blocks the transmission of the forward-transferred data packet, and does not allow the AP to send the forward-transferred data packet according to the table row; IP address of the source AP global is set to an invalid value, indicating that the table row blocks the transmission of the reverse-transferred data packet, and does not allow the AP to transmit the reverse-transferred data packet according to the table row.

The invalid value of the global IP address entry of the previous hop station refers to the value that cannot be value of the global IP address of some previous hop station, including but not limited to: local IP address defined by the IP protocol, other non-global IP addresses defined by the IP protocol, global IP address of the AP itself, etc. Select one or part of the values as the first invalid value, and select another or some other value as the second invalid value. A typical selection method of the first invalid value is to select the global IP address of the AP itself as the invalid value. In this case, the non-global IP address defined by the IP protocol can be selected as the second invalid value.

The invalid value of the global IP address entry of the source AP refers to the value that cannot be value of global IP address of the source AP, including but not limited to: local IP address defined by the IP protocol, and other non-global IP addresses defined by the IP protocol.

When a handover, crossing multiple cells, of a user station occurs, the handover of crossing multiple cells is composed of multiple handovers of crossing previous and next cells. In the process of the handover between the previous and next cells, the continued transmission of data transmitted between the previous and next cells is realized by configuring a continuation guide table in an AP of a previous cell and an AP of a next cell. The connection of the user data after the handover across multiple cells can be realized by the connection of all the two previous and next cells.

When a user station switches from the previous cell to the next cell, the configuration of the continuation guide table in the two APs can be implemented through signaling interaction between the user station, AP of the next cell, and AP of the previous cell.

Since the user station accesses one cell each time in the process of the handover of crossing multiple cells, it is possible to initiate a connection in the cell to a certain station in the external network to form a new data transmission, and therefore, after each handover between the previous and next cells occurs, the data stream that needs to be continuously transmitted by the user station may include the data stream of the previous cell AP as the source AP, and may also include the data stream of not using the previous cell AP as source AP. AP of the previous cell needs to be configured correspondingly in the continuation guide table for the two data streams. The data of the previous cell AP is used as the source AP, and the previous cell AP needs to create a new table row in its continuation guide table; and for the data stream of not using the previous cell AP as source AP, the configuration has already created the corresponding table row in its continuation guide table, so only need to configure the related entries in these table rows. AP of the previous cell also sends information about all the table rows related to the current user station in the continuation guide table to AP of the next cell, and AP of the next cell configures its own continuation guide table according to the information.

When the user station crosses the previous and next two cells, the process of configuring the continuation guide table for AP the previous cell and AP of the next cell is respectively given by the process S1 and the process S2.

process S1: When AP of the previous cell discovers that the user station has left the cell and enters the new cell, it fills the value of user station MAC address entry of the table row corresponding to the user station in the wireless transfer table with an invalid value; then create a new table row in the continuation hop table, fill in the first invalid value in the global IP address entry of the last hop station of the table row, and fill in global IP address table of the source AP entry with its own global IP address, fill IP address of the user station in the current cell in the IP address of the user station in the source cell entry, fill global IP address of the next cell AP in the IP address of the user station in IP address of the next hop station entry, using entries of IP address of the next hop station of the previous in the continuation hop table as search terms, the previous cell AP in the continuation hop table searches for the value of the entry which is equal to the table row of the IP address of the user station in the cell, and searches for all table rows corresponding to the user station in the continuation hop table; then for each searched table row, in its next hop station IP address entry, replaces the original user station's IP address in the cell with the global IP address of the next cell AP; Through signaling interaction with AP of the next cell, the former cell AP sends the information of the above newly created table row and all the searched table rows (recorded as information M1) to AP of the next cell. Specifically, the information of the table rows (the information M1) may only include information of two entries: global IP address of the source AP, and IP address of the user station in the source cell.

After the user station accesses the next cell, AP of the next cell interacts with AP of the previous cell for signaling interacts to obtain the information M1 in the process S1, that is: information about the table rows related to the data flow of the current user station in the connection hop table of the previous cell AP; for each table row in the information M1, AP of the next cell creates a new table row in its continuation hop table, fill the values in the global IP address entry of source AP and IP address entry of the user station in the source cell in the same name entry of the newly created table row. The global IP address of the previous cell AP is filled in the global IP address entry of the previous hop station of the new table row, the IP address of the user station in the next cell is filled in the IP address entry of the next hop station of the new table row.

During the process of the user station switching from the source cell to the terminal cell, every time when handover, crossing previous and next cells, of a user station occurs, APs of the previous cell and the next cell need to configure their own continuation guide table through the above processes S1 and S2. After the user station arrives at the terminal cell, AP of the terminal cell and AP of its previous hop complete the configuration of the continuation guide table, based on the configuration of the continuation guide table established in the AP, a data link of network layer is constructed between the correspondent station of the user station and the user station, which is composed of the correspondent station of the user station, AP of the source cell, 0, 1 or more APs of intermediate cell, AP of the final cell, and the user station located in the terminal cell. According to the configured continuation guide table, on the data link, each AP can find not only the next hop station that forwards the forwarded data packet, but also the address of the next hop station that forwards the reverse data packet, so that data transmission between the correspondent station of the user station and the user station located in the terminal cell can be realized. That is to say, the data transmission initiated by the user station at the source cell and its correspondent station, after it arrives at the final cell, data will be transmitted continuously through this data link.

The data link between the correspondent station of the user station and the user station located in the terminal cell is formed or implemented by table rows corresponding to the current user data flow in the continuation guide table of each AP, and the table row corresponding to the data stream in the continuation guide table of AP of each intermediate cell, does not include the IP address of the user station in the intermediate cell, and thus, the implementation of the above data link constructed between the correspondent station of the user station and the user station located in the terminal cell does not require (or does not depend on) the IP address of the user station in the intermediate cell, in other words, data transmission of the user station through the data link will not need to use (or not depend on) the IP address of user station in the intermediate cell.

Further, unless the user station initiates a data connection with other correspondent stations of the user station (for this data flow, AP of the intermediate cell is its source AP) when the user station is in the intermediate cell, after the user station leaves the intermediate cell, the IP address configured at the intermediate cell can be released.

The data link constructed between the correspondent station of the user station and the user station is a two-way data link, including a forward data link from the correspondent station of the user station to the user station and a reverse data link from the user station to its correspondent station.

In the method provided by the present disclosure, data transmission on the data link constructed between the correspondent station of the user station and the user station, in addition to the data transmission between the correspondent station of the user station and AP of the source cell, data transmission between other stations (including forward and reverse data transmission) encapsulate the data packet by IP in IP and then send it to the next hop station. The source address and destination address of the outer IP packet of the IP in IP packet are the source address and the destination address of the hop transmission, respectively, and the inner IP packet (the original IP packet) is the packet sent between AP of the source cell and the user station assume that when the user station is still in the source cell.

In the method provided by the present disclosure, when AP of wireless network cell or a user station receives a data packet encapsulated in an IP in IP manner, assuming that this may be a data packet that is continuously forwarded, it decapsulates the packet and tries to follow the process that should be followed for continued transmission. Specifically, if the AP finds that the received data packet matches the table row in the continuation guide table, the AP performs further processing according to the matched table row; otherwise, the data packet is discarded; if the user station finds that the received data packet matches the data flow of its own continued transmission, accepting it as a data packet sent to itself, otherwise, discarding the data packet.

On the reverse data link, since the user station does not have a continuation guide table, it cannot obtain the address of the next hop station through the continuation guide table.

The user station can receive the forwarded packet sent to it through the forward link, and obtain address of the next hop station when it transmits data through the reverse link by analyzing the address of the packet. Specifically, after receiving the IP in IP packet sent to it on the forward link and confirming that this is a continued forwarding packet sent to itself, the user station takes the source address of the IP in IP packet as the address of the next hop station when it sends the packet on the reverse link.

The above address can also be obtained by signaling interaction between the user station and AP of the final cell. In this case, the user station can send data to the station through the reverse link to its correspondent station before receiving packets on the forward link.

At this point, based on the above-mentioned network layer data link between the correspondent station of the user station and the user station constructed by the continuation guide table of the AP, it is possible to realize that data being transmitted between the correspondent station of the user station when the handover of crossing multiple cells occurs can be transmitted continuously, after the user station arrives at the terminal cell.

The disclosure also provides a method to optimize the hop path based on continuation hop table of AP, so that the data continuously transmitted can reach the target station in a shorter path.

Specifically, when the AP configures its continuation guide table through processes S1 and S2, or in the process of data transmission according to this configuration after the configuration is completed, the AP can compare the two entries of global IP address of the previous hop station and global IP address of the source AP in the row table of the continuation hop table. If the two values are different and the global IP address of the previous hop station is a valid address, the AP can directly hop to the user data stream by establishing a direct path with the source AP. This eliminates hop redundancy in the hop path that currently transfers user station data.

The process for the AP which find hop redundancy to establish a direct hop with the source AP is as follows.

Process S3: specifically includes:

S301: AP finds in its continuation hop table that the global IP address table entry of the previous hop station is different from the table entry of global IP address of the source AP, and that the global IP address of the previous hop station is a valid address, AP decides to build a direct hop path with the source AP.

S302: From the table row found above, the current AP obtains two values of global IP address of the source AP and IP address of the user station in the source cell, it sends a signaling to request to the source AP to establish a direct hop, which contains the IP address of the user station in the source cell;

S303: The source AP receives the signaling sent by the current AP to establish a direct hop, obtains the IP address of the user station in the source cell by the signaling, and also obtains the global IP address of the current AP. AP searches its continuation hop table for table rows that meet the following criteria: global IP address entry of the source AP which is equal to global IP address of the source AP, and IP address entry of the user station in the source cell that is equal to the IP address of the user station in the source cell in signaling, the global IP address entry of the station that is equal to the first invalid value. After searching for the qualified table row, the source AP sends signaling to the current AP to accept the hop optimization.

S304: The source AP creates a new table row in its continuation hop table, and copies the table row that was just searched to the table row, but fills in the global IP address entry of the next hop station of the new table row with global IP address of the current AP which requests to establish a direct hop. At the same time, the source AP sets the global IP address entry of the previous hop station in the table row that was just searched to the second invalid value.

S305: After receiving the signaling of the source AP that accepts the hop optimization, the current AP creates a new table row in the continuation hop table, and copies the table row initially found in the process S301 to the table row, but fill the global IP address table entry of the previous hop station in the new table row with the global IP address of the source AP in the newly created table row. After that, the current AP sets the global IP address entry of the source AP on the table row found in the process S301 to an invalid value.

In the above process S304, the source AP sets the global IP address table entry of the previous hop station on the table row to the second invalid value to block packets transmitted on the forward link. This method provided by the present disclosure agrees as follows, when the AP receives the continuation packet transmitted on the forward link, and then search out the continuation hop table row corresponding to the data packet, it first checks whether the global IP address entry of the previous hop station on the table row is a valid value or the first invalid value, if it is a valid value or a first invalid value, send the forward transmitted data packet according to the next hop station pointed to in the table row; if it is a second invalid value, indicating that the forward transmitted data packet is blocked, and thus do not send the forward transmitted data packet according to the table row (in fact, it can already send the forward transmitted data packet according to the optimized path)

In the process of the foregoing process 305, the current AP sets the global IP address entry of the source AP on the table row to an invalid value, in order to block the data packet transmitted by the reverse link. The method provided by the present disclosure agrees that when the AP receives the continuation packet transmitted on the reverse link, and then search out the continuation hop table row corresponding to the data packet, it first checks whether the global IP address entry of the source AP of the table row is a valid value, if it is a valid value, send the reverse transmitted data packet according to the next hop station pointed to in the table row; if it is a invalid value, indicating that the reverse transmitted data packet is blocked, and thus do not send the reverse transmitted data packet according to the table row (in fact, it can already send the reverse transmitted data packet according to the optimized path)

The above optimization of the data link can eliminate the hop redundancy in the data link, but also requires an overhead, such as: signaling interaction between the current AP and the source AP, etc. In the specific use of the method of the present disclosure, it can be agreed that AP is only allowed to do this optimization if certain conditions are met, such as: only when the AP finds that a user station is sufficiently small after entering the cell, or when the user station stays in the cell for more than a certain period of time, it is likely the AP of the final cell, the optimization of the above hop path is performed.

In the method provided by the present disclosure, since the user station may adopt a local IP address in the source cell, there may be a situation where two user stations that switch across multiple cells adopts the same local IP address in different source cells. In this case, when the two user stations all switch across multiple cells, using different paths enter the same cell, and then switch to the same next cell from the cell, the table rows in the continuation direction table of the two user stations in the previous cell AP will have the same IP address entry of the user station in the source cell and the same IP address entry of the next hop station. Similarly, the table rows in the continuation direction table of the two user stations in the next cell AP will have the same IP address entry of the user station in the source cell and the same IP address entry of the previous hop station. In this way, when the data packet transmitted by the forward link of one of the two user stations enters the AP of the next cell, according to the search flow for the table row of the continuation hop table (see the flow of searching the table row in the processes S402 and S403 below), the next cell AP will search for two qualified table rows according to the global IP address table entry of the previous hop station and IP address table entry of the user station in the source cell, therefore, the packet will need to be continuously forwarded through two paths (but only one of them is the correct path). Similarly, when the data packet transmitted by the reverse link of one of the two user stations enters the AP of the previous cell, according to the search flow for the table row of the continuation hop table (see the flow of searching the table row in the processes S503 below), the previous cell AP will search for two qualified table rows according to the global IP address table entry of the next hop station and IP address table entry of the user station in the source cell, therefore, the packet will need to be continuously forwarded through two paths (but only one of them is the correct path). As a result, redundant forwarding of contiguous data is generated. These redundantly forwarded packets will eventually arrive at the user station on the forward link or at the AP of the source cell on the reverse link. At the user station, by analyzing the IP address and TCP port number of the correspondent station of the user station contained in the internal IP packet, the packet sent to the correct user station will be accepted, while the packet sent to the wrong user station will be discarded by the user station. At the user station, by parsing the correspondent station IP address and TCP port number of the user station included in the inner IP packet, the data packet sent to the correct user station will be accepted and sent to the wrong user station. The packet will be dropped by the user station. Similarly, at the source cell AP, by parsing the correspondent station IP address and TCP port number of the user station included in the inner IP packet, the data packet sent to the correct source AP will be sent to the user by the source AP. The correspondent station of the station, and the packet destined for the wrong source AP is discarded at the source AP. Similarly, at the source cell AP, by analyzing the IP address and TCP port number of the correspondent station of the user station contained in the internal IP packet to the station, packets sent to the correct source AP will be continuously sent from the source AP to the correspondent station of the user station, while packets sent to the wrong source AP will be discarded at the source AP.

The problem of redundant forwarding of continued data transmission mentioned above can be solved by hop optimization on the corresponding table row in the continuation hop table, when AP finds such redundant forwarding. In particular, when AP finds that the value of the user station's IP address table entry in the source cell is equal to the value of the global IP address table entry of the previous hop station for two table rows in its continuation hop table, the AP processes one or all of the two table rows according to process S3, and gets the corresponding table row that implements direct hop. Since then, the table row associated with the data transmission between the two user stations in the continuation hop table of the current AP have different global IP address table entries of the previous hop station, thus avoiding the redundant forwarding described above.

The data transmitted between the user station and its correspondent station is continuously transmitted through the established data link. In the process of this continued transmission, if there is an AP to optimize the above hop path, the optimization will not affect the transmission of a packet that has been sent. For optimizing the hop path of the current AP and source AP for (see process S3), before such hop optimization occurs, data packets that have been sent to the next hop station (the next hop station of the forward link or the reverse link) will be transmitted through the original hop path and finally reach the user station or the source AP. After the hop optimization is completed, data packets sent by the current AP and the source AP will be sent through the optimized hop path.

On the optimized data link, each AP can not only find the next hop station that continuously forwards the forward data packet through its continuation guide table, but also can find out the address of the next hop station that continuously forwards the reverse data packet the reverse transmission data packet.

Since the path obtained by the above path optimization only reduces the intermediate cell AP in the original path without adding a new intermediate cell AP, The implementation of the data link constructed by the above path optimization between the correspondent station of the user stations of the cell and the user station located in the terminal cell also does not require (or does not depend on) the IP address of the user station in the intermediate cell, or the transmission of data of the user station through the optimized data link does not require (or does not depend on) the IP address of the user station in the intermediate cell. Moreover, since the optimized data link is generated by the original data link optimization, on the optimized data link, the processing after the transmission and reception of the data packets will be the same as the original processing, the only difference is to perform the corresponding processing according to the optimized table row. For example, on the optimized data link, except the data transmission between the correspondent station of the user station and the source cell AP, the data transmission between other stations encapsulates the data packet by IP in IP; after the user station received the IP in IP packet sent to it on the forward link, it uses the source address of the IP in IP packet as the address of the next hop station on the reverse link; and so on.

Since the AP optimizes the existing hop link in the process of continued data transmission, the optimization causes the data packet transmitted to the AP before the optimization to be transmitted through the original path, and the data packet transmitted to the AP after optimization to be transmitted through the optimized path. Therefore, whether it is the forward data transmission from the correspondent station of the user station to the user station, or the reverse data transmission from the user station to its correspondent station, there may be two or more hop paths at the same time. These different hop paths are called sub-links. On each sub-link, each AP can find its address of the next hop station that forwards the forward transmitted data packet through its continuation guide table, and can also find out its address of the next hop station that forwards the reverse transmitted data packet. Further, both the forward link and the reverse link for implementing the user data continued transmission will be composed of one or more sub-links. Among them, the data link without any optimization of the hop path can be regarded as a special case where a data link formed by a sub-link.

In this way, through the configuration of the continuation guide table of the AP and the optimization after configuration, a network layer data link for realizing continued transmission of user data after switching across multiple cells is obtained, and the data link includes a forward link and a reverse link, the links in each direction are composed of one or more sub-links. Each sub-link on the forward link consists of the correspondent station of the user station, AP of the source cell, 0, 1 or more APs of the intermediate cell, AP of the final cell, and the user station; each sub-link on the reverse link is composed of a user station, AP of the terminal cell, 0, 1 or more APs of the intermediate cell, AP of the source cell, and a target station of the user station.

When the data packet sent from the correspondent station of the user station to the user station is transmitted on the forward link, the process of processing the transmitted data packet by each station on the link (specifically, each sub-link of the link) is as follows:

Flow of packet transmission on forward sub-link (flow S4):

AP of the source cell (S401): AP of the source cell receives the data packet from the correspondent station of the user station, and processes the data according to the situation when the user station is still in the local cell, obtains the data packet to be sent to the user station, and then sends the data packet to the wireless transfer table. In the wireless transfer table, AP of the source cell finds that the MAC address of the user station is an invalid value, and knows that the user station has switched to access other cells, and then, and turn to the continuation hop table; in the continuation hop table, the source AP searches for the following table rows: the value of the IP address entry of the user station in the source cell is equal to the IP address of the current user station in the cell, the value of the global IP address entry of the source AP is equal to the global IP address of the AP itself, the value of the global IP address entry of the previous hop station is the first invalid value, obtains the global IP address of the next hop station from the table row; AP of the source cell constructs an IP in IP packet by using the above-mentioned data packet to be sent to the user station as an inner IP packet.

AP of the Intermediate cell (S402): AP of the intermediate cell receives the IP in IP packet from the previous hop station, extracts the inner IP packet, and extracts the source address of the outer IP packet and the destination address of the inner IP packet. In the continuation hop table, the two addresses are respectively compared with the global IP address entry of the previous hop station of each table row and the IP address entry of user station in the source cell. Find all the table rows that match the two entries (may get two or more table rows), and get the global IP address of the next hop station from these table rows; AP of the intermediate cell constructs an IP in IP packet by using the inner IP packet obtained above as an inner IP packet, and then send the packet to the next hop station.

AP of the terminal cell (S403): AP of the terminal cell receives the IP in IP packet from the previous hop station, extracts the inner IP packet, and extracts the source address of the outer IP packet and the destination address of the inner IP packet. In the continuation hop table, the two addresses are respectively compared with the global IP address entry of the previous hop station of each table row and the IP address entry of user station in the source cell. Find all the table rows that match the two entries, and get the IP address of the next hop station from these table rows; According to the IP address of the next hop station obtained by the search, AP of the terminal cell determines that it is an IP address of the user station in the cell, and constructs an IP in IP packet by using the inner IP packet obtained as the inner IP packet, the target address of the external IP packet is the IP address of the user station in the cell, and then send the packet to the wireless transfer table. AP of the terminal cell obtains the MAC address of the user station in the wireless transfer table, encapsulates the IP in IP packet constructed above, and sent it to the user station.

user station (S404): The user station receives the IP in IP packet sent by AP of the terminal cell to itself, and extracts the inner IP packet; after that, it processes the IP packet as if it were still in the source cell.

When the data packet sent from the user station to its correspondent station is transmitted on the reverse link, the process of processing the transmitted data packet at each station on the link (specifically, on each sub-link of the link) is as follows.

The process of packet transmission on the reverse sub-link (flow S5) is as follows:

user station (S501): The user station constructs an IP packet sent to its correspondent station as if it were still in the source cell; it constructs an IP in IP packet using the packet as the inner IP packet, and sends the packet to the next hop station.

AP of the terminal cell (S502): AP of the terminal cell receives the IP in IP packet from the user station, extracts the inner IP packet, and extracts the source address of the outer IP packet and the source address of the inner IP packet; it searches the continuation hop table for table rows that meet the following criteria: the IP address entry of the next hop station is equal to the source address of the outer IP packet, and the IP address entry of the user station in the source cell is equal to the source address of the inner IP packet, and global IP address entry of the source AP is a valid value, the global IP address of the previous hop station of the row is the address of the next hop station currently transmitted. AP of the terminal cell constructs an IP in IP packet by using the inner IP packet obtained above as the inner IP packet, and then sends the packet to the next hop station.

AP of the intermediate cell (S503): AP of the intermediate cell receives the IP in IP packet from the previous hop station, extracts the inner IP packet, and extracts the source address of the outer IP packet and the source address of the inner IP packet. It searches the continuation hop table for table rows that meet the following criteria: IP address entry of the next hop station is equal to the source address of the outer IP packet, IP address entry of the user station in the source station is equal to the source address of the inner IP packet, and global IP address entry of the source AP is a valid value. The global IP address of the previous hop station of these table rows (possibly two or more table rows) is the address of the next hop station currently transmitted; AP of the intermediate cell constructs an IP in IP packet by using the inner IP packet obtained above as the inner IP packet, and then sends the packet to the next hop station.

AP of the source cell (S504): AP of the source cell receives the IP in IP packet from the previous hop station, extracts the inner IP packet, and extracts the source address of the outer IP packet and the source address of the inner IP packet; in the continuation hop table, the two addresses are respectively compared with the IP address entry of the next hop station of each table row and the IP address entry of user station in the source cell, find all the table rows that match the two entries and obtain the global IP address of the previous hop station of the table row. When it is ready to forward the data packet according to the global IP address of the previous hop station, the IP address is found to be an invalid value (the first invalid value or the second invalid value), the next hop station is the correspondent station of the user station; it treats the above internal IP packet as the IP data packet sent to it when the user station is still in the source cell, and processes the packet as if the user station were still in the source cell (when the user station is configured with a global IP address in the source cell, the process is simple forwarding), and then sends it to the correspondent station of the user station.

In the method provided by the present disclosure, the redundancy of the continuation guide table can be eliminated in time by adopting a method of setting a maximum silence period for the table row of the continuation guide table of the AP. Specifically, set a maximum silence period for each table row of the continuation guide table of the AP. If a table row has not been used for longer than the maximum silence period, the AP considers that the table row has expired and expired, and it removes the table row from its continuation guide table.

For the IP address configured by the AP for the user station accessing the cell, a maximum silence period may also be set, and the maximum silence period is not less than the maximum silent period set for the continuation guide table row. If an IP address configured for the user's station has not been used exceeding its maximum silent period, the AP considers it to be an expired IP address. In this case, the AP can delete the IP address configuration of the corresponding user station and reclaim the IP address. At this time, all the table rows related to the IP address in continuation guide table of the AP have been deleted.

In the technical solution provided by the present disclosure, the AP and the user station include at least two parts: a network layer part and a layer part below network layer, wherein the network layer part implements network layer related functions and supports IP protocol, the layer part below network layer implements the functions of the physical layer and the MAC layer of the station.

The technical solution provided by the present disclosure realizes the continued transmission of the user data stream being transmitted by constructing a continuation guide table in the AP, and the continuation guide table is located in the network layer part of the AP. The continuation guide table of the AP includes a continuation table hop table and a wireless transfer table, and the wireless transfer table is obtained by extending the assignment range of the original wireless transfer table in the AP. For user stations in the cell without a handover, the wireless transfer table will not affect the wireless forwarding function of these stations.

Figure 4:
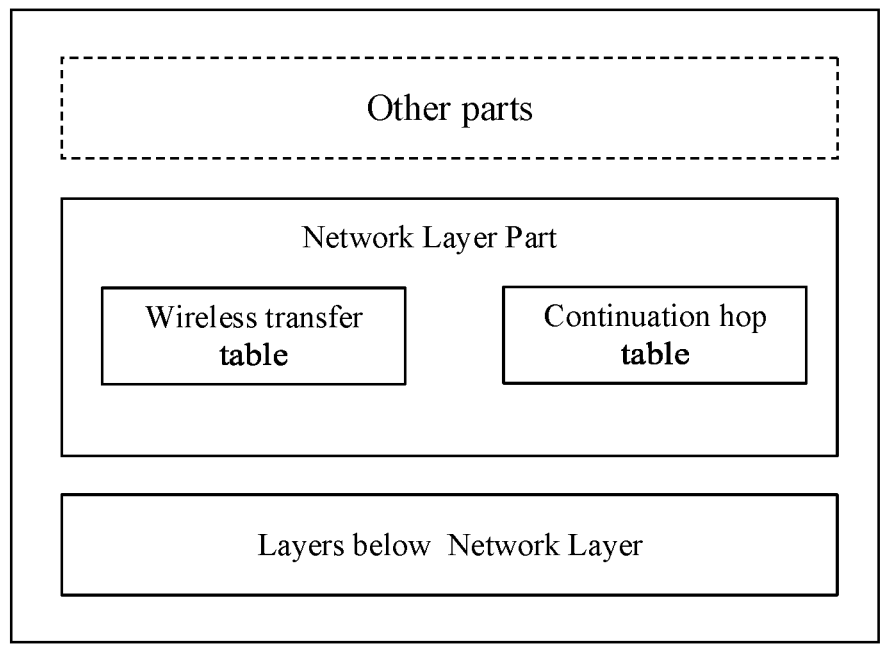
FIG. 4 is a schematic diagram of an access point AP device according to an embodiment of the present disclosure.

The structure of the access point AP device is shown in FIG. 4.

The disclosure also discloses an AP of a wireless network cell, which is internally provided with a continuation guide table, which further comprises a continuation hop table and a wireless transfer table. The continuation hop table in the AP has the following functions: for a user station that has accessed or is still in the cell, when the data packet of the user station is continuously transmitted to the AP, by using the table AP can find out the address of the next hop station which forwards the data packet. The wireless transfer table in the AP has the following functions: the table is used to indicate the information that the user station leaves the local cell and enters a new cell, and the AP finds the wireless MAC address of the user station, or determine that it has left the cell and entered the new cell according to the IP address of the user station of the cell.

In the AP, the wireless transfer table is used to indicate the information that the user station leaves the local cell and enters a new cell, but the indication does not affect the wireless forwarding function of the user station of the table without a handover, for the user station without a handover in the cell, the AP implements normal wireless forwarding function through the table.

The disclosure also discloses a terminal of a wireless network (a user station of a wireless network), which comprises an IP address module, which is used for: after confirming that the received inner IP packet encapsulated in the IP in IP packet (the original IP packet) is sent to its own continuous forwarding packet, use the source address of the above IP in IP packet as the address of the next hop station of the terminal reverse transmission packet.

The present disclosure can be implemented or used by those skilled in the art in light of the disclosed embodiments. Various modifications to these embodiments are obvious to those skilled in the art, and the general principles defined herein may be applied to other embodiments without departing from the scope and spirit of the disclosure. The above-mentioned embodiments are merely preferred embodiments of the present disclosure, and are not intended to limit the present disclosure. Any modifications, equivalents, improvements, etc., which are included in the spirit and principles of the present disclosure, should be included in the scope of protection of the present disclosure.

What is claimed is:

1. A method for continued data transmission of a user station moving across a plurality of wireless network cells including a source wireless network cell and a terminal wireless network cell, comprising:
  for each wireless network cell, constructing a continuation guide table in a corresponding access point of the wireless network cell, the continuation guide table including a continuation hop table for finding a network address of a next hop station according to an IP address of a previous hop station and an IP of a source access point in the continuation hop table and a wireless transfer table for determining that the user station has left the wireless network cell, and for each wireless network cell, the continuation hop table including a third data column of the IP address of the previous hop station, a fourth data column of the IP address of the source access point, a fifth data column of an IP address of the user station in the source wireless network cell, and a sixth data column of the IP address of the next hop station;
  in response to the user station moving from a first wireless network cell to a second wireless network cell in the plurality of wireless network cells, configuring the continuation guide table in the corresponding access point of the first wireless network cell, and configuring the continuation guide table in the corresponding access point of the second wireless network cell;
  in response to the user station reaching the terminal wireless cell in the plurality of wireless network cells, constructing a data link in a network layer between the user station and a correspondent station according to the continuation guide table in the corresponding access point of each wireless network cell; and
  performing the continued data transmission between the correspondent station and the user station through the data link.

2. The method according to claim 1, further comprising:
  optimizing a hop path along the data link by the corresponding access point of one or more of the plurality of wireless network cells.

3. The method according to claim 2, wherein optimizing the hop path along the data link comprises:
  for each of the one or more of the plurality of wireless network cells, in response to the corresponding access point of the wireless network cell detecting a source access point of the continued data transmission being a different access point from the corresponding access point of a previous wireless network cell, optimizing the continuation guide table in the corresponding access point of the wireless network cell and the continuation guide table in the corresponding access point of the source wireless network cell, and configuring a section of the hop path connecting the corresponding access point of the wireless network cell and the corresponding access point of the source wireless network cell.

4. The method according to claim 2, further comprising:
  before optimizing the hop path, in response to a data packet already starting to be transmitted along the data link before optimizing the hop path, continuing transmitting the data packet along the data link.

5. The method according to claim 1, wherein for each wireless network cell:
  the wireless transfer table includes a first data column of an IP address of the user station and a second data column of a MAC address of the user station; and
  an invalid data entry in the second data column indicates that the user station has left the wireless network cell.

6. The method according to claim 1, wherein for each wireless network cell:
  a first invalid data entry value in the third data column indicates that the network cell is the source network cell;
  a second invalid data entry value in the third data column indicates that a forward transmission of the data packet is not allowed; and
  an invalid data entry value in the fourth data column indicates that a reversed transmission of the data packet is not allowed.

7. The method according to claim 1, further comprising:
  searching the continuation hop table to find an IP address of a first hop station to forward the data packet in a forward transmission from the correspondent station to the user station; and
  searching the continuation hop table to find an IP address of a second hop station to forward the data packet in a reverse transmission from the user station to the correspondent station.

8. The method according to claim 1, wherein:
  the data link includes a forward link from the correspondent station to the user station and a reverse link from the user station to the correspondent station;
  the forward link includes one or more sub-links, each sub-link including the correspondent station, the corresponding access point of the source wireless network cell, the corresponding access point of one or more intermediate wireless network cells, the corresponding access point of the terminal wireless network cell, and the user station; and
  the reverse link includes one or more sub-links, each sub-link including the user station, the corresponding access point of the terminal wireless network cell, the corresponding access point of one or more intermediate wireless network cells, the corresponding access point of the source wireless network cell, and the correspondent station.

9. The method according to claim 1, wherein constructing the data link in the network layer between the user station and the correspondent station comprises:
  constructing the data link without using an IP address of the user station in one or more intermediate wireless network cells of the plurality of wireless network cells.

10. The method according to claim 1, wherein performing the continued data transmission between the correspondent station and the user station through the data link comprises:
  encapsulating a data packet by an IP in IP protocol; and
  sending the encapsulated data packet to a next hop station.

11. The method according to claim 10, further comprising:
  in response to the user station receiving an IP in IP packet forwarded by a previous hop station, recording a source address of the IP in IP packet as the network layer address of the next hop station for a reversed packet transmission.

12. An access point device located in a wireless network cell for continued data transmission of between a user station and a correspondent station, configured to:
  construct and store a continuation guide table in the access point device, the continuation guide table including a continuation hop table for finding a network address of a next hop station according to an IP address of a previous hop station and an IP address of a source access point in the continuation hop table and a wireless transfer table for determining that the user station has left the wireless network cell, and for each wireless network cell, the continuation hop table including a third data column of the IP address of the previous hop station, a fourth data column of the IP address of the source access point, a fifth data column of an IP address of the user station in the source wireless network cell, and a sixth data column of the IP address of the next hop station;

configure the continuation guide table when a cross-cell handover of the user station occurs; and forward data transmitted by the user station according to the continuation guide table.

13. The access point device according to claim 12, wherein:

the wireless transfer table includes a first data column of an IP address of the user station and a second data column of a MAC address of the user station; and an invalid data entry in the second data column indicates that the user station has left the wireless network cell.

14. The access point device according to claim 12, wherein:

a first invalid data entry value in the third data column indicates that the network cell is the source network cell;

a second invalid data entry value in the third data column indicates that a forward transmission of data is not allowed; and an invalid data entry value in the fourth data column indicates that a reversed transmission of data is not allowed.

15. The access point device according to claim 12, wherein the access point device is further configured to:

search the continuation hop table to find an IP address of a first hop station to forward data in a forward transmission from the correspondent station to the user station; and search the continuation hop table to find an IP address of a second hop station to forward the data packet in a reverse transmission from the user station to the correspondent station.

* * * * *